United States Patent
Riordan et al.

[15] 3,652,886
[45] Mar. 28, 1972

[54] SELF-ALIGNING SENSOR

[72] Inventors: Hugh E. Riordan, Wyckoff; Malcolm D. Jones, Belleville, both of Mich.

[73] Assignee: Kelsey-Hayes Company, Romulus, Mich.

[22] Filed: May 1, 1970

[21] Appl. No.: 31,853

Related U.S. Application Data

[63] Continuation of Ser. No. 741,687, July 1, 1968, abandoned.

[52] U.S. Cl. .............................................. 310/168, 310/89
[51] Int. Cl. ..................................................... H02k 17/42
[58] Field of Search ............... 310/168, 169, 154, 155, 156, 310/178, 181, 66, 85, 89, 170

[56] References Cited

UNITED STATES PATENTS 2,500,730   3/1950   Yonkers ............................... 310/168
3,500,091   3/1970   Jones .................................... 310/168
2,769,953   11/1956  Schwan ................................ 310/168
2,824,245   2/1958   Trevitt .................................. 310/168

Primary Examiner—J. D. Miller
Assistant Examiner—R. Skudy
Attorney—Harness, Dickey & Pierce

[57] ABSTRACT

An electrical rotational speed sensor constructed to provide an electrical signal indicative of the rotational speed between a pair of members one of which is supported for rotation relative to the other and having a rotor connected to the rotatable member and a stator connected to the other stationary member and having a mounting structure for the rotor and stator whereby one of the rotor and stator can move radially in response to radial movement of the other of the rotor and stator as a result of relative movement between the two members.

15 Claims, 5 Drawing Figures

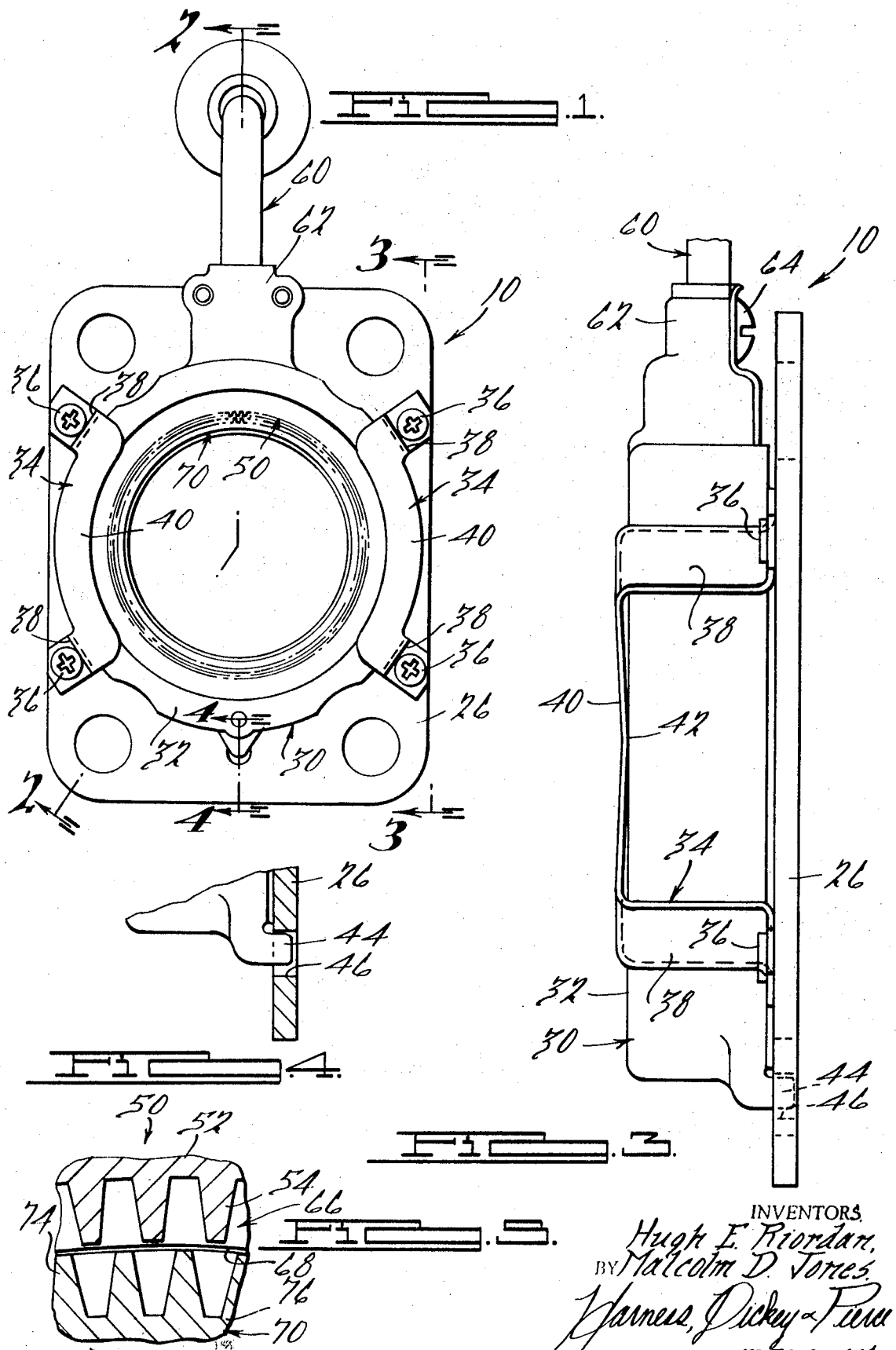

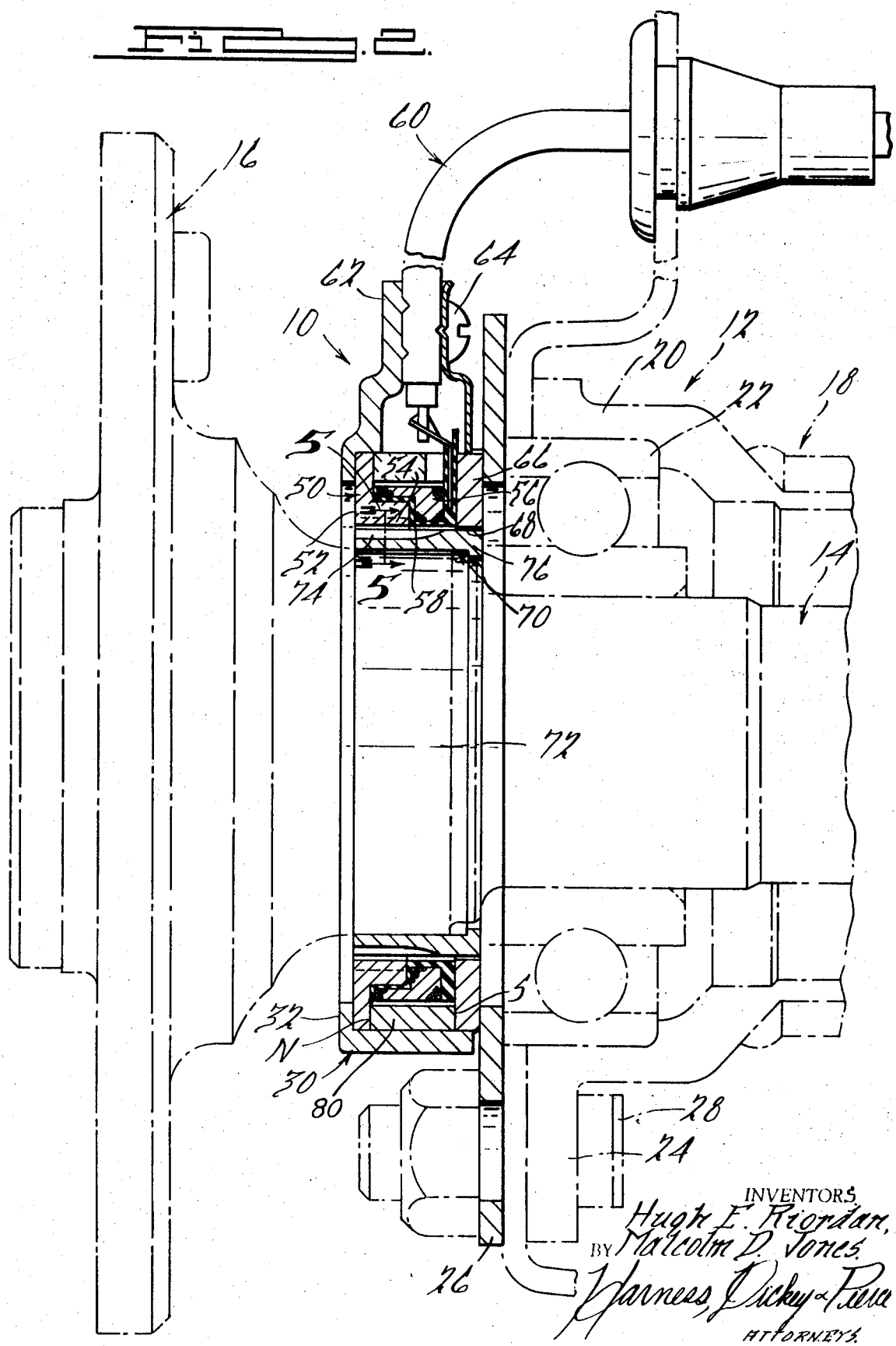

3,652,886

SELF-ALIGNING SENSOR

This is a continuation of an application Ser. No. 741,687, filed July 1, 1968 now abandoned.

SUMMARY BACKGROUND OF THE INVENTION

The present invention relates to electrical speed sensors.

In sensing the rotational speed at the rear wheels of a vehicle, a desirable location for the sensor is between the axle shaft flange and axle housing of the rear wheel. However, it has been found that under severe load conditions the rear axle shaft undergoes substantial radial deflection relative to the housing. With a sensor construction having a pair of relatively rotatable pole members, one being fixed to the axle housing and the other being fixed to rotate with the axle shaft, it has been found that the extreme deflections under severe load of the axle shaft cause sufficient reduction of the air gap between the sensor pole members such that the two members engage each other resulting in damage to the sensor. This could be avoided by providing a sufficient air gap or spacing between the two sensor pole members such that even under the most extreme load conditions of the axle shaft such engagement would not occur. However, with such a construction a relatively wide air gap would be required reducing the efficiency of the sensor. In the present invention the air gap is maintained at a minimum and the sensor pole member fixed to the axle housing is mounted in a floating construction such that for extreme radial deflections of the axle shaft to pole member mounted to the housing will be moved while maintaining a desired minimum air gap. Upon cessation of the deflection condition, the sensor pole member mounted to the axle housing will be returned generally to its original position. With such a construction, the air gap can be maintained at a minimum and a highly efficient construction can be provided.

Therefore, it is an object of the present invention to provide an improved sensor construction for sensing relative rotation between two relatively rotating members.

It is another object of the present invention to provide a new and improved sensor construction of the above described type in which the sensing rings or poles are movable together under extreme load conditions causing relative deflection between the members whose relative rotational speed is being sensed.

It is another object of the present invention to provide a novel and improved sensor construction for use with the rear axle assembly of a vehicle in which the sensing rings or poles of the sensor are mounted to the axle shaft and axle housing for radial movement together under extreme radial axle deflections whereby a minimum air gap can be maintained.

Other objects, features, and advantages of the present invention will become apparent from the subsequent description and the appended claims, taken in conjunction with the accompanying drawings, in which:

FIG. 1 is an end elevational view of the sensor assembly of the present invention;

FIG. 2 is a sectional view to enlarged scale of the sensor assembly of FIG. 1 taken generally along the lines 2—2 and shown in assembly relationship with a rear axle assembly (shown in phantom);

FIG. 3 is a side view of the sensor assembly of FIG. 1 taken generally along the lines 3—3;

FIG. 4 is a sectional view to enlarged scale taken generally along the lines 4—4 in FIG. 1; and FIG. 5 is a sectional view to enlarged scale taken generally along the lines 5—5 in FIG. 2.

Looking now to the drawings, the sensor assembly is generally indicated by the numeral 10 and is shown in assembly relationship with a rear axle assembly 12 (shown in phantom), which rear axle assembly includes an axial shaft 14 which terminates at its outer end in a flange 16 to which a wheel assembly (not shown) can be mounted. The axle shaft 14 is rotatably mounted within an axle housing assembly 18 which can be of a conventional construction which terminates at its outer end in a bell-shaped portion 20 in which is mounted a bearing 22 which in turn supports the axle shaft 14.

The bell portion 20 terminates in a radially outwardly extending flange 24 to which at least a portion of the sensor assembly 10 is mounted.

Sensor assembly 10 has a generally flat retainer member 26 secured to the flange 24 by a plurality of fastener assemblies 28. While the retainer 26 is immovably held to the axle housing 18, a sensor housing member 30 is mounted (in a manner to be described) for limited radial movement relative to the retainer 26. The housing 30 is generally of an annular, ring shaped construction and is completely open at its rearward end and has a radially inwardly extending flange 32 at its forward end. The housing 30 is resiliently movably clamped to the retainer 26 by a pair of spring retainers 34 (see FIGS. 1 and 3) which are fixed to the retainer 26 by fasteners 36, Each of these spring retainers 34 includes a pair of L-shaped leg portions 38 which are connected at their upper ends with a retaining strap portion 40. The strap portion 40 generally overlies the flange 32 of the housing 30 and is depressed inwardly as at 42 such as to engage the flange 32 of the housing 30 under a preselected preload, whereby the housing 30 will be resiliently clamped to the retainer member 26. The strap portion 40 is arcuately shaped and generally matches the contour of the outer surface of the housing 30; however, the leg portions 38 are generally in clearance relation whereby the housing 30 can be moved without interference.

The housing 30 has an inwardly extending tap or projection 44 which is locatable within an enlarged slot 46 in the retainer member 26. This connection positively holds the housing 30 from rotating relative to retainer 26 while permitting some movement of the housing 30 relative to the retainer 26. An annular, generally L-shaped cross sectioned stator or pole member 50 is mounted in the housing 30 and located at its forward end against the flange 32 and terminates radially inwardly in an axially extending portion 52 which is provided with a plurality of circumferentially disposed axially extending teeth 54 (see FIG. 3). A coil 56 is wound and supported in a plastic bobbin 58 which in turn is at least partially supported upon the stator 50. The coil 56 and bobbin 58 extend annularly. A conductor assembly 60 has conductors appropriately connected to the coil 56 with the body of the conductors 60 being secured by means of clamp and fastener assembly to a radially extending neck portion 62 at the upper portion of the housing 30. Thus, the electrical signal generated at the coil 56 will be transmitted up by the conductor assembly 60. A generally flat, washer-shaped bearing member 66 is supported within and located at the rearward end of the housing 30. Note that the inside diameter 68 of the bearing 66 is slightly less than the inside diameter defined by the teeth 54; this serves a purpose to be described. An annular rotor member 70 is fixed for rotation onto a circular portion 72 of the axle shaft 14. The rotor 70 is provided with a plurality of axially extending teeth 74 at its radially outer periphery, which teeth 74 are in axial alignment with the teeth 54 of the stator 52. The rotor 70 terminates at its axially inner end in a generally smooth annular portion 76 which is in radial confrontation with the radially inner surface 68 of the bearing 66. Note that the gap between these confronting radial surfaces (see FIG. 5) is less than the gap between teeth 74 on the rotor and teeth 54 on the stator 50.

An annular permanent magnet 80 is supported in the housing 30 between the bearing 66 and one leg portion of the stator 50. It is located at the radially outer extremity of the coil 56. The permanent magnet 80 is polarized to have axial north and south poles as indicated in FIG. 2. The housing 30, of course, is made of a nonmagnetic material to thereby insure proper travel of the flux of the magnet 80. In application, the air gap between the confronting teeth 54 and 74 is selected to be at a minimum such as to provide for an efficient sensor construction. Under severe load applications applied to the wheel secured to the outer end of the axle shaft 14, the axle shaft 14 will deflect radially relative to the axle housing 18, and hence the rotor 76 on the axle shaft 14 will move radially relative to the stator 50. Under severe deflection conditions the confronting surface 76 of the rotor 70 will engage the bearing surface 68 of the bearing 66. When this occurs, there will still be some air gap between the teeth 54 and 74, and hence no damage will occur to the teeth. Upon further deflection, the entire housing 30 will move about the connection defined by the projection 40 and enlarged slot 46 and the springs 34. Thus a nonrigid connection is provided for the housing 30 and its associated components including the stator 50 such that for severe deflections of the axle shaft 14 relative to the axle housing 18, the entire housing 30, including stator 50, will be moved to thereby maintain at least a preselected minimum gap between teeth 74 and teeth 54 preventing damage to the teeth and also to the sensor in general. The pivot connection defined by the projection 44 and the slot 46 while permitting limited pivotal movement prevents any appreciable rotation as a result of rotational forces imparted to the housing 30 via the bearing 66 and from the rotor 70. Upon termination of the severe deflection condition, the housing 30 and its associated components including the stator 50 can be returned to their normal positions. Note that while there will be some slight variations in air gap as the space between the bearing 66 and rotor 90 is taken up in one direction the space in the opposite direction is correspondingly increased resulting in substantially no change in the total air gap effect. In some applications the gap between bearing 66 and rotor 70 could be eliminated. Since the teeth 54 and 76 extend axially, relative axial motion between axle shaft 14 and housing assembly 18 will inherently provide no change in air gap width and hence is automatically compensated by the present construction.

Therefore, with the construction as shown and described a minimum air gap can be provided between the stator and rotor without danger of these members being damaged due to severe deflections. With the provision of such a minimum air gap, an efficient sensor is provided.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. An electrical rotational speed sensor for providing an electrical signal indicative of the rotational speed between a pair of members with one of the members supported for rotation relative to the other, the sensor comprising: a rotor connected to one of the members for rotation therewith, a stator, said rotor and said stator having concentric, radially confronting portions and having circumferentially disposed teeth on at least one of said confronting portions with said portions being separated by an air gap which extends axially and with said air gap being maintained at a preselected minimum distance separating said portions as said rotor and said stator are moved relatively toward each other in said given direction, mounting means for mounting said stator to the other of the members proximate to said rotor including a bearing member connected to said stator engaging said other member for providing radial movement of said stator assembly with respect to said other member, said bearing member being adapted to be engaged by said rotor for radially moving said stator in a given direction in response to relative radial movement of said rotor with respect to said stator in said given direction when said air gap is at a preselected minimum to maintain at least said minimum air gap between said rotor and said stator.

2. The sensor of claim 1 with both of said portions having teeth and with said one of said rotor and said stator being said stator, said mounting means comprising a retaining plate fixed to the other of the members, housing means for supporting said stator and said bearing member, and resilient means connecting said housing means to said retaining plate for movement of said housing means, said stator, and said bearing member in said given direction in response to engagement of said bearing member with said rotor.

3. The sensor of claim 2 with said mounting means further comprising pivot means connecting said housing means to said retaining plate for limited rotational movement only.

4. The sensor of claim 3 with the one member being an axle shaft and with the other member being an axle housing.

5. The sensor of claim 3 with said mounting means mounting said rotor and stator for relative axial movement with substantially no change in said gap.

6. The sensor of claim 5 including an annular magnet supported in said housing means, said stator and said bearing member being annular.

7. An electrical rotational speed sensor for providing an electrical signal indicative of the rotational speed between a pair of members with one of the members supported for rotation relative to the other, the sensor comprising: a rotor connected to one of the members for rotation therewith, a stator, mounting means for mounting said stator to the other of the members proximate to said rotor with an air gap separating said rotor and stator including a bearing member connected to said stator having a radially extending first surface portion slidably engaging said other member for providing radial movement of said stator assembly with respect to said other member, said bearing member further having a generally axially extending second surface portion being adapted to be engaged by said rotor for radially moving said stator in a given direction in response to relative radial movement of said rotor with respect to said stator in said given direction when said air gap is at a preselected minimum to maintain at least said minimum air gap between said rotor and said stator and further being adapted to be disengaged from said rotor when said air gap is greater than said preselected minimum.

8. The sensor of claim 12 with said rotor and said stator having concentric, radially confronting portions.

9. The sensor of claim 7 with said rotor and stator having circumferentially disposed confronting surfaces separated by a gap with at least one of said surfaces having a plurality of teeth, said mounting means mounting sai rotor and stator for relative axial movement with substantially no change in said gap.

10. The sensor of claim 7 with said mounting means including means for providing resilient engagement between said bearing member and said other member.

11. The sensor of claim 7 with said bearing member being an annular member.

12. The sensor of claim 11 with said bearing member wherein said first surface portion engaging said other member is radially aligned and said second surface portion for engaging said rotor is axially aligned.

13. The sensor of claim 12 with said first surface being a radial surface and with said other surface being a central bore in said bearing member.

14. The sensor of claim 13 with said mounting means including a housing for said stator and wherein said bearing member is fixedly secured to said housing.

15. An electrical rotational speed sensor for providing an electrical signal indicative of the rotational speed between a pair of members with one of the members supported for rotation relative to the other, the sensor comprising: a rotor connected to one of the members for rotation therewith, a stator, mounting means including a housing for said stator for mounting said stator to the other of the members proximate to said rotor with an air gap separating said rotor and stator including an annular bearing member fixedly secured to said stator housing having a radial surface engaging said other member for providing radial movement of said stator assembly with respect to said other member, said mounting means including resilient means bearing against said housing for resilient engagement of said bearing member radial surface with said other member, said bearing member having a central bore in said bearing member being adapted to be engaged by said rotor for radially moving said stator in a given direction in response to relative radial movement of said rotor with respect to said stator in said given direction when said air gap is at a preselected minimum to maintain at least said minimum air gap between said rotor and said stator.

* * * * *

UNITED STATES PATENT OFFICE
CERTIFICATE OF CORRECTION

Patent No. 3,652,886         Dated March 28, 1972

Inventor(s) Hugh E. Riordan and Malcolm D. Jones

It is certified that error appears in the above-identified patent and that said Letters Patent are hereby corrected as shown below:

Col. 3, line 6, after "and," first occurrence, insert --the--.

Col. 4, line 33, claim 8, "12" should be --7--.

Col. 4, line 38, "sai" should be --said--.

Signed and sealed this 6th day of February 1973.

(SEAL)
Attest:

EDWARD M. FLETCHER, JR.
Attesting Officer

ROBERT GOTTSCHALK
Commissioner of Patents